US011934804B2

(12) United States Patent
Knoulich et al.

(10) Patent No.: US 11,934,804 B2
(45) Date of Patent: Mar. 19, 2024

(54) METHOD AND SYSTEM FOR GENERATING AND EXECUTING A SOFTWARE APPLIANCE

(71) Applicant: Quadient Software Inc., Milford, CT (US)

(72) Inventors: Jan Knoulich, Hradec Kralove (CZ); Petr Novotny, Prelouc (CZ); Avi Greenfield, Glenview, IL (US)

(73) Assignee: Quadient Software Inc., Milford, CT (US)

( * ) Notice: Subject to any disclaimer, the term of this patent is extended or adjusted under 35 U.S.C. 154(b) by 0 days.

(21) Appl. No.: 17/658,021

(22) Filed: Apr. 5, 2022

(65) Prior Publication Data

US 2022/0317982 A1    Oct. 6, 2022

(30) Foreign Application Priority Data

Apr. 6, 2021  (CH) ..................................... 00350/21

(51) Int. Cl.
*G06F 8/60* (2018.01)
*G06F 8/35* (2018.01)

(52) U.S. Cl.
CPC . *G06F 8/35* (2013.01); *G06F 8/60* (2013.01)

(58) Field of Classification Search
CPC .......... G06F 8/36; G06F 8/443; G06F 8/4432; G06F 8/4441; G06F 8/70; G06F 8/76
See application file for complete search history.

(56) References Cited

U.S. PATENT DOCUMENTS

| 8,793,379 | B2 * | 7/2014 | Upadhya | G06F 3/0632 |
| | | | | 717/174 |
| 2009/0328077 | A1 * | 12/2009 | Kashyap | G06F 9/445 |
| | | | | 719/328 |
| 2015/0149993 | A1 * | 5/2015 | Pohlmann | G06F 9/45545 |
| | | | | 717/174 |
| 2018/0285250 | A1 * | 10/2018 | Helsley | G06F 11/3409 |
| 2018/0341471 | A1 | 11/2018 | Stefanov et al. | |

OTHER PUBLICATIONS

Search Report for Swiss Application No. CH 3502021, dated Feb. 2, 2022, in 4 pages.
Ruiz et al., "Reconstructable Software Appliances with Kameleon," Operating Systems Review, ACM, New York, NY, US, vol. 49(1), pp. 80-89, Jan. 20, 2015. XP058063921, ISSN: 0163-5980, DOI: 10.1145/2723872.2723883.

* cited by examiner

*Primary Examiner* — Hanh Thi-Minh Bui
(74) *Attorney, Agent, or Firm* — Knobbe Martens Olson & Bear LLP

(57) ABSTRACT

A computer-implemented method and a computer system are disclosed for generating and executing a software appliance comprising the steps of receiving a work request comprising metadata which indicates processing conditions for a computer processing task to be performed; determining a determined processing environment, depending on the metadata included in the work request; selecting one or more software container templates, depending on the metadata included in the work request; generating the software appliance for the determined processing environment, using the one or more selected software container templates; and deploying the software appliance for executing the software appliance on a processing computer system of the determined processing environment.

13 Claims, 3 Drawing Sheets

METHOD AND SYSTEM FOR GENERATING AND EXECUTING A SOFTWARE APPLIANCE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates to a computer implemented method and a computer system for generating and executing a software appliance. Specifically, the present disclosure relates to a computer implemented method for generating and executing a software appliance on a processor of a computer system, and to a computer system comprising a processor configured to generate and execute a software appliance.

Description of the Related Art

A strong trend in computing, in particular in server computing, has been to move to ever increasing levels of abstraction through the use of intermediate software layers between the computing hardware and the software application it is executing. A kernel, which is a computer program which directly interfaces with the computing hardware, forms the core of a computer's operating system. Typically, the kernel forms part of a single operating system in which software applications are executed. The kernel resides in a part of the virtual memory called the kernel space, which virtual memory is itself an abstraction of the physical memory (volatile and non-volatile data storage) available to the computing hardware. The software applications then reside in a part of the virtual memory called the user space. However, using modern operating system (OS) level virtualization, the kernel allows the existence of multiple user space instances called containers. These containers are isolated from each other and present, to software applications being executed on them, virtual computing hardware and resources, the resources including network input/output, peripherals, etc. One example of a product which supports such containerization is Docker, which can package an application and its dependencies into a virtual container which can run on any operating system, such as Linux, Windows, or MacOS.

The use of containers allows for flexible and efficient deployment and scaling of single software applications, software bundles, or entire computing environments, as the software applications themselves along with all necessary libraries, configuration files, and data (for example as stored in a database) can be packaged into containers and deployed as a whole. The containers can be deployed on server computers which are on-premises, in a public cloud, or in a private cloud.

Modern platforms, such as Openshift and Kubernetes, allow automated deployment, scaling in response to load, monitoring and management of containerized software applications across clusters of hosts, such as large cloud computing centers.

A software appliance is a type of software application which is bundled with at least part of an operating system. The software appliance can easily be implemented on computing hardware because no installation or configuration is required.

U.S. Pat. No. 8,321,948 B2 discloses one or more software appliances whose operational parameters may be set using a configuration manager. Additionally, a deployment and a licensing manager are disclosed to maintain compliance of the operating parameters with the license terms.

SUMMARY OF THE INVENTION

It is an object of this disclosure to provide a computer implemented method and a computer system for generating and executing a software appliance. In particular, it is an object of the present disclosure to provide a computer implemented method for generating and executing a software appliance on a processor of a computer system, and to provide a computer system comprising a processor configured to generate and execute a software appliance.

According to the present disclosure, these objects are achieved through the features of the independent claims. In addition, further advantageous embodiments follow from the dependent claims and the description.

According to the present disclosure, the above-mentioned objects are particularly achieved by a computer-implemented method of generating and executing a software appliance, whereby the method comprises receiving in a computer system a work request from a requesting computer, the work request comprising action data, workload data, and metadata. The action data defines a computer processing task to be performed. The workload data is input for the computer processing task to be performed, and the metadata indicates processing conditions for the computer processing task to be performed. The method further comprises the computer system determining from a processing environment repository a determined processing environment, depending on the metadata included in the work request. The method further comprises the computer system selecting from a software container template repository one or more selected software container templates, depending on the action data and the metadata included in the work request. The method further comprises the computer system generating the software appliance for the determined processing environment, using the one or more selected software container templates. The method further comprises the computer system deploying the software appliance for executing the software appliance on a processing computer system of the determined processing environment, using the workload data included in the work request.

In an embodiment, generating the software appliance comprises the computer system generating one or more software containers, using the selected software container templates and the metadata included in the work request, and generating the software appliance using the one or more generated software containers.

In an embodiment, the method further comprises the processing computer system of the determined processing environment generating a processing result by executing the software appliance, and transmitting the processing result to the requesting computer.

In an embodiment, the metadata includes hardware requirements for the processing computer system of the processing environment, the hardware requirements including an amount of memory, an amount of disk storage space, and/or processing power; and determining the processing environment comprises the computer system using the hardware requirements.

In an embodiment, the metadata includes software requirements for the processing environment, the software requirements including an operating system and/or a database type; and determining the processing environment comprises the computer system using the software requirements.

In an embodiment, the metadata includes security requirements for the processing environment, the security requirements including an on-premise computing centre, a cloud computing centre, and/or an authentication level; and determining the processing environment comprises the computer system using the security requirements.

In an embodiment, the metadata includes processing requirements related to execution of the computer processing task to be performed, the processing requirements including scheduling data, cost data, and/or energy efficiency data; and executing the software appliance comprises the computer system using the processing requirements.

In an embodiment, the action data includes identification data for the computer processing task to be performed, the identification data defining a software application, a software program, a software processing engine, and/or a software formatting engine; and selecting the one or more selected software container templates comprises the computer system using the identification data.

In an embodiment, the action data includes operational data for the computer processing task to be performed, the operational data defining an operational parameter for a software application, a software program, and/or a software processing engine, and/or format specification for a software formatting engine; and selecting the one or more selected software container templates comprises the computer system using the operational data.

In an embodiment, the method comprises the computer system receiving a processing command directed to the software appliance, and responsive to the processing command executing the processing command by performing stop execution of the software appliance and/or return status information related to execution of the software appliance.

In addition to a computer-implemented method of generating and executing a software appliance, the present disclosure also relates to a computer system for generating and executing a software appliance, the computer system comprising one or more processors configured to perform a number of steps. The steps include receiving a work request from a requesting computer. The work request comprises action data, workload data, and metadata, the action data defining a computer processing task to be performed, the workload data being input for the computer processing task to be performed, and the metadata indicating processing conditions for the computer processing task to be performed. The steps further include
determining from a processing environment repository a determined processing environment, depending on the metadata included in the work request. The steps further include selecting from a software container template repository one or more selected software container templates, depending on the action data and the metadata included in the work request. The steps further include generating the software appliance for the determined processing environment, using the one or more selected software container templates. The steps further include deploying the software appliance for executing the software appliance on a processing computer system of the determined processing environment, using the workload data included in the work request.

In an embodiment, the one or more processors are further configured to perform the method as described above.

In addition to a computer-implemented method of generating and executing a software appliance and a computer system for generating and executing a software appliance, the present disclosure also relates to a computer program product comprising a non-transitory computer readable medium having stored thereon program code configured to control one or more processors of a computer system such that the computer system performs a number of steps. The steps include receiving a work request from a requesting computer, the work request comprising action data, workload data, and metadata, the action data defining a computer processing task to be performed, the workload data being input for the computer processing task to be performed, and the metadata indicating processing conditions for the computer processing task to be performed. The steps further include determining from a processing environment repository a determined processing environment, depending on the metadata included in the work request. The steps further include selecting from a software container template repository one or more selected software container templates, depending on the action data and the metadata included in the work request. The steps further include generating the software appliance for the determined processing environment using the one or more selected software container templates. The steps further include deploying the software appliance for executing the software appliance on a processing computer system of the determined processing environment, using the workload data included in the work request.

In an embodiment, the program code is further configured to control the one or more processors of the computer system such that the computer system performs the method as described above.

BRIEF DESCRIPTION OF THE DRAWINGS

The present disclosure will be explained in more detail, by way of example, with reference to the drawings in which.

DETAILED DESCRIPTION OF THE PREFERRED EMBODIMENT

Figure 1:
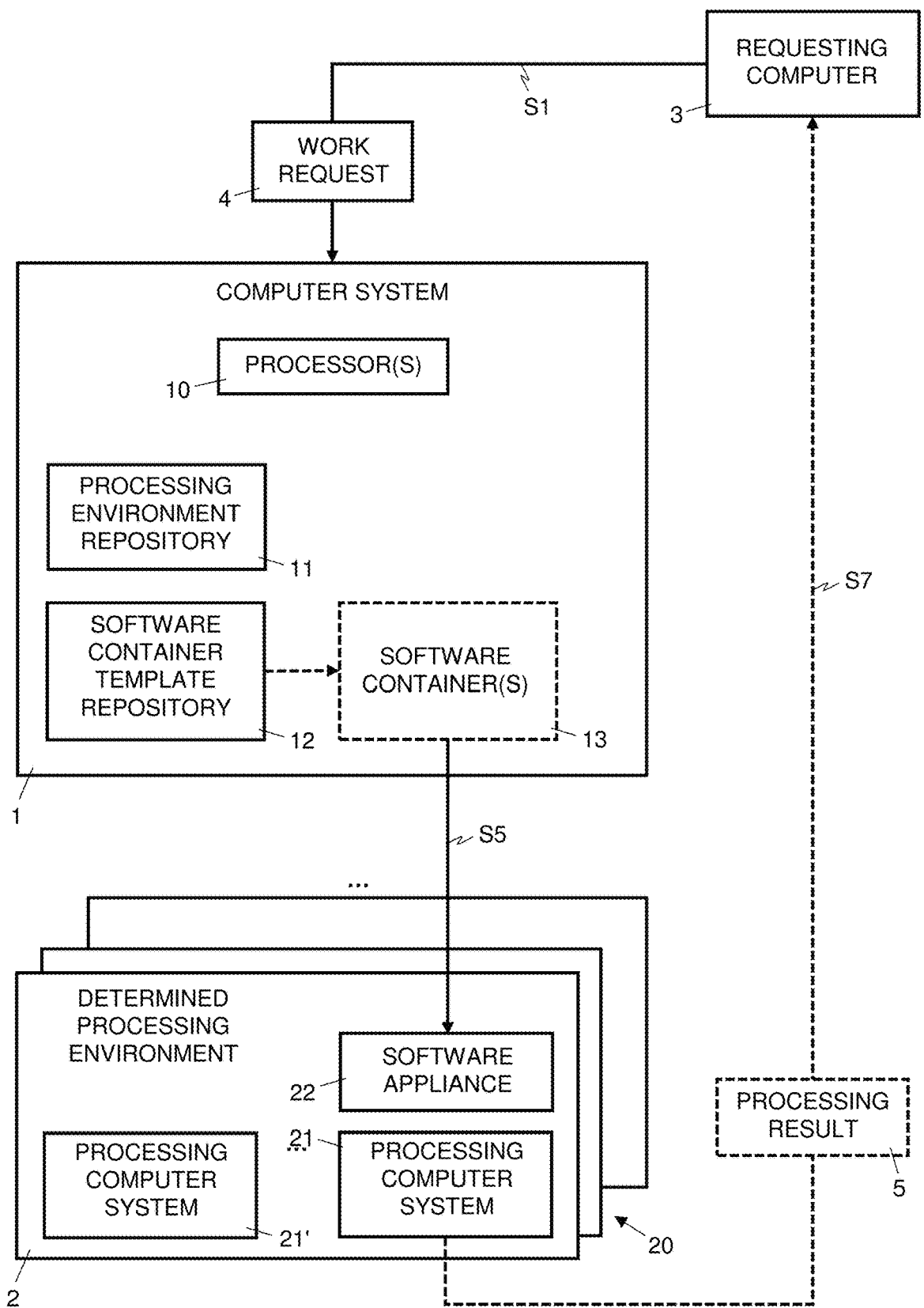
FIG. 1: shows a flow diagram illustrating schematically a computer system receiving a work request from a requesting computer, generating a software appliance, and deploying the software appliance for execution on a processing computer system of a determined processing.

In FIG. 1, reference numeral 1 refers to a computer system. The computer system 1 comprises one or more computers, each having one or more processors 10, as well as memory, which includes both volatile memory and non-volatile memory, and a communication interface allowing the one or more computers of the computer system 1 to communicate with each other as well as allowing the computer system 1 to communicate with other computers, which may be located on-premises or located remotely. The communication interface, for example, communicatively connects the computer system 1 to a network, such as the Internet. In particular, the computer system is communicatively connected to a requesting computer 3 and to a number of processing computer systems 21, 21' of various processing environments 2.

The requesting computer 3 comprises one or more processors and memory (both volatile memory and non-volatile memory) and may be located on-premises with the computer system 1 or located remotely from the computer system 1. The requesting computer 3 is configured to generate a work request 4, as explained in more detail with reference to FIG. 2.

The computer system 1 comprises a processing environment repository 11. The processing environment repository 11 is stored in the memory of the computer system 1 and comprises, for example, a database, a table, and/or a list. The processing environment repository 11 includes identifiers of a plurality of processing environments 2 to which the computer system 1 is communicatively connected.

Additionally, the processing environment repository 11 stores a plurality of processing environment specifications, each processing environment specification being associated with a particular processing environment 2 of a plurality of different processing environments 20.

In an embodiment, the processing environment specification includes a hardware configuration of a processing computer system 21 of the associated processing environment 2. The hardware configuration includes one or more of: an amount of memory, an amount of disk storage space, and/or processing power. In an embodiment, the hardware configuration further includes, for each associated processing environment 2, one or more of: a processor configuration of at least one processor of the processing computer system 21, a processing power of the processing computer system 21, a memory configuration of at least one memory unit of the processing computer system 21, and/or a server type of one or more server computers of the processing computer system 21. The processing power includes a measure of the computing performance of the processing environment 2, such as number of floating point operations per second (FLOPS).

In an embodiment, at least one processing environment 2 of the plurality of processing environments 20 comprises a plurality of processing computer systems 21, 21', which processing computer systems 21, 21' are in a plurality of locations, embodied, for example, as a distributed cluster of data centres.

In an embodiment, the processing environment specifications include a software configuration of the associated processing environment 2. For example, the software configuration comprises an operating system configuration and/or a database type. The operating system configuration relates not only to a specific type of operating system but also includes specific operating system components. The operating system configuration relates to an operating system of the processing computer system 21, which, in an embodiment, is a stripped-down operating system having only a kernel, which kernel is configured for operating-system level virtualization to allow the existence of multiple user space instances, which instances are software appliances 22 according to the present disclosure.

Software appliances 22 comprise one or more software applications and one or more components of an operating system, the software appliance 22 being configured to be executable in the processing environment 2, in particular the processing computer system 21. In an embodiment, the software appliance 22 comprises one or more of the following: one or more databases, one or more software libraries, or state-data relating to one or more application states of the one or more software applications. In particular, the software appliance 22 is configured for use in a plurality of different virtualized hosting environments, in particular in the different processing environments 2, 20, using operating-system level virtualization, such that the software appliance 22 is immediately executable on the processing computer system 21, in particular that the one or more software applications are executable on the processing computer system 21 without requiring an installation of the one or more software applications.

In an embodiment, the processing environment specifications include security properties of the processing environment 2. The security properties include one or more of: a security level, an authentication level, a data encryption level, a data protection level, and/or a location property. The security level relates to a level of physical security maintained for a room, floor, and/or data centre in which the processing environment 2, in particular the processing computer system 21, is located. A high security level comprises the use of access controlled entry-ways and surveillance including cameras and guards. A low security level may have less robust physical barriers, less stringent access control, and less surveillance. The authentication level relates to which persons and/or other computer systems are given physical and/or virtual access to the processing computer system 21. A high authentication level grants access only a person and/or computer system belonging to a select group of authorized persons and/or systems with the authorization being checked using a robust and secure authentication protocol. The data encryption level relates to a cryptographic protocol used for encrypting data received by, stored in, and/or transmitted by the processing computer system 21. A standard data encryption level uses, for example, AES 256 encryption, while a high data encryption level may use a greater key length or, advantageously, use so-called quantum proof encryption designed to be resistant to anticipated decryption capabilities of quantum computers. The data protection level refers to data protection policies in force in a jurisdiction in which the processing environment 2 resides, in particular related to the explicit or implicit capabilities of government agencies of that jurisdiction, or a related jurisdiction, to intercept data communications traffic, demand access to data communications traffic or stored data, or other compromise the security of the processing computer system 21. The location property includes whether the processing computer system 21 is an on-premise computing centre, in particular, whether the processing computer system 21 is located on the same premises as the requesting computer 3 and/or the computer system 1. The location property includes whether the processing computer system 21 is a cloud computing centre located remotely from the requesting computer 3 and/or the computer system 1. Additionally, the location property includes, in an embodiment, a geographic location property, such as whether the processing computer system 21 is located in a computing center in the same country or on the same continent as the requesting computer 3 and/or the computer system 1.

In an embodiment, the processing environment specifications include energy efficiency data relating to a measure of performance per watt, measured, for example, using the LINPACK benchmark.

In an embodiment, the processing environment specifications further include computing load information relating to a current and/or forecasted computing load of the processing environment 2.

In an embodiment, the processing environment specifications further include scheduling data relating to available time slots and, optionally, available computing resources in the respective time slots. The scheduling data optionally further relates to a processing priority data and/or processing deadline data.

In an embodiment, the processing environment specifications further include an interface specification relating to one or more digital communication interfaces which the processing computer system 21 uses to communicate with the computer system 1 and/or the requesting computer 3.

In an embodiment, the processing environment specifications further include cost data relating to a cost of using the processing computer system 21. In particular, the cost data relates to the cost of using one processing node of the processing computer system 21 for a pre-determined time period, which processing node comprises, for example, one or more CPUs and/or one or more GPUs.

The processing environment 2 comprises a processing computer system 21, 21' and security properties of the processing computer system 21. As explained above in relation to the processing environment repository 11 and the processing environment specifications of each processing environment 2, 20 identified in the processing environment repository 11, the processing computer system 21, 21' has a number of further technically relevant specifications which go beyond the hardware and/or software configuration of the processing computer system 21, 21'. A number of examples are given in the following paragraphs to illustrate different combinations of such further technically relevant specifications.

A first example of a processing environment 2, 20 relates to a processing computer system 21, in this example a server computer, located in a secure access controlled room on-premises and having a Linux kernel, which processing computer system 21 is not communicatively connected to the Internet and is communicatively connected only to a local network. The processing computer system 21 of this processing environment 2 is configured with an authentication level such that only authorized computer systems and users have access to the computer resources of the server computer. In particular, the server computer is configured such that only particular computer systems 1 may communicate, over the local network, with the server computer. In particular, the processing computer system 21 is configured such that only software appliances 22 from a particular processing computer system 21 and/or having a particular identifier and/or type may be deployed to and executed on the processing computer system 21. Such a processing environment 2 has security properties which ensure a relatively high level of data security.

A second example of a processing environment 2, 20 relates to a processing computer system 21 located remotely, i.e. off-site, in relation to the computer system 1 and/or the requesting computer 3, and communicatively connected to the computer system 1, for example via the Internet, via a wide area network (such as a software-defined wide area network using multiprotocol label switching), or via a dedicated private physical layer. The processing environment 2 of this example has security properties which provide a relatively lower level of data security, in comparison to the first example, because the data communication between the computer system 1 and the processing computer system 21, or the data connection between the processing computer system 21 and the requesting computer 3, is susceptible to electronic eavesdropping. Additionally, by virtue of being located remotely, it can be more difficult to guarantee a high level of physical security relating to the processing computer system 21, i.e. ensuring that the processing computer system 21 is not tampered with.

A third example of a processing environment 2, 20 relates to a public cloud-computing platform such as Amazon Web Services (AWS), Google Cloud Platform, or Microsoft Azure, which are hosted in data centres located remotely, often in a different geographic area, and typically communicatively connected to the computer system 1 via the Internet. Such a processing environment 2 has security properties which result in an even lower level of data security than the first two examples. This is because of the larger possibility of security breaches in the processing environment 2 itself, because it is operated by a third party, and because of the possibility of the communication between the computer system 1 and the processing environment 2 being electronically eavesdropped.

The computer system 1 further comprises a software container template repository 12. The software container template repository 12 is stored in the memory of the computer system 1, for example in a database. The software container template repository 12 comprises a plurality of software container templates. For example, the software container templates comprise software container configuration files. The software container templates comprise, in an embodiment, one or more of the following: one or more software applications, one or more software libraries, one or more components of an operating system, and/or one or more databases.

In an embodiment, the software container templates are used by the computer system 1 to generate the software containers 13 in step S4 as explained with reference to FIG. 2.

In an embodiment, a software container template, or a software container 13 generated using the software container template, is used to generate a software appliance 22. The software container template used for generating the software appliance 22 is selected from the software container template repository 12 according to data included in the work request 4 as explained below. The software appliance 22 is generated such that it can be executed on the processing computer system 21.

In an embodiment, the computer system 1 has stored in the memory, in association with each software container template, a software container specification relating to one or more of the following technical specifications of the particular software container: environment requirements, payload capabilities, security capabilities, and/or digital interfaces. The environment requirements relate to particular processing environments 2, 20 with which the software container is compatible. The payload capabilities relate to properties of the work request 4 as detailed below. The security capabilities relate to how secure the software container is when deployed to and being executed on the processing computer system 21, in particular how secure the data contained in the software container is. The digital interfaces relate to digital communication interfaces which the software container has for communicating with the computer system 1 and the requesting computer 3. Additionally, in an embodiment, the container repository and the stored software container templates comprise one or more digital signatures for allowing the computer system 1 and/or the processing computer system 21 to identify the software container and/or the software appliance generated using the software container template or the software container.

In an embodiment, the software container template repository 12 additionally contains state data relating to a pre-determined state which the generated software appliance 22 is to have. The state data is designed to be loaded into memory in the processing computer system 21 such that the software appliance 22 is, upon execution, immediately initialized into the pre-determined state.

Steps S1, S5 and S7, along with the work request 4 and the processing result 5, are explained in detail below with reference to FIG. 2.

Figure 2:
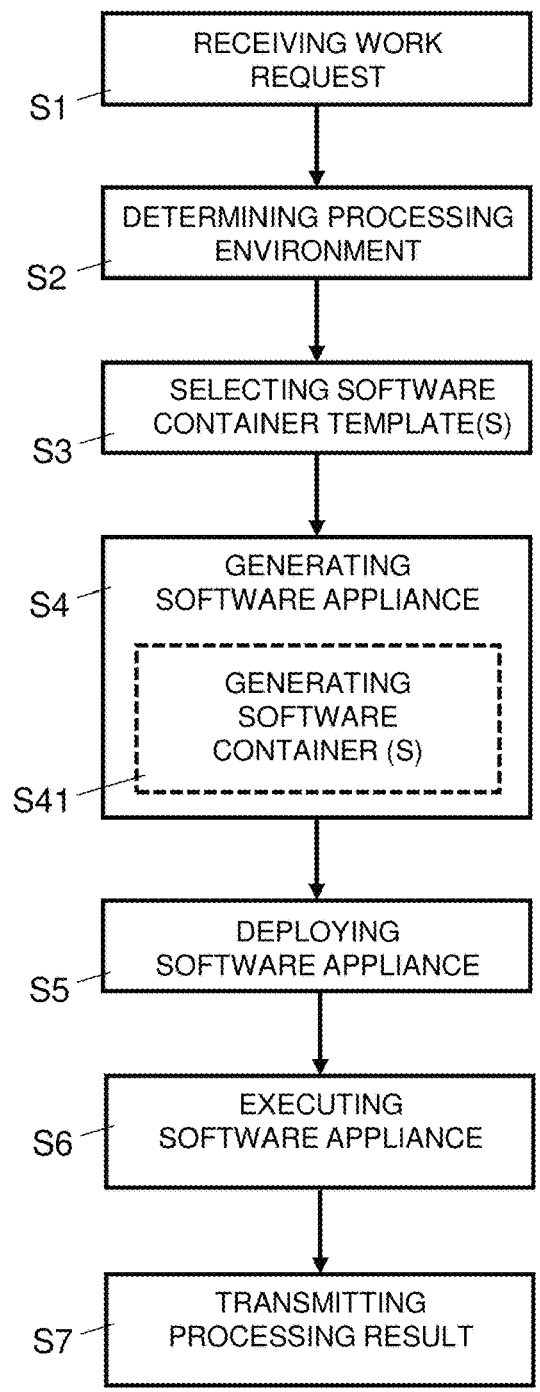
FIG. 2: shows a flow diagram illustrating an exemplary sequence of steps for generating and executing a software appliance in response to a work request.

FIG. 2 shows a flow diagram illustrating an exemplary sequence of steps for generating and executing a software appliance 22. Steps S1, S5, and S7 are shown also in FIG. 1. In a preparatory step (not shown), the work request 4 is generated in the requesting computer 3. The work request 4 consists of one or more data packages, and comprises action data 41, workload data 42, and metadata 43. The action data 41 defines a computer processing task to be performed.

Figure 3:
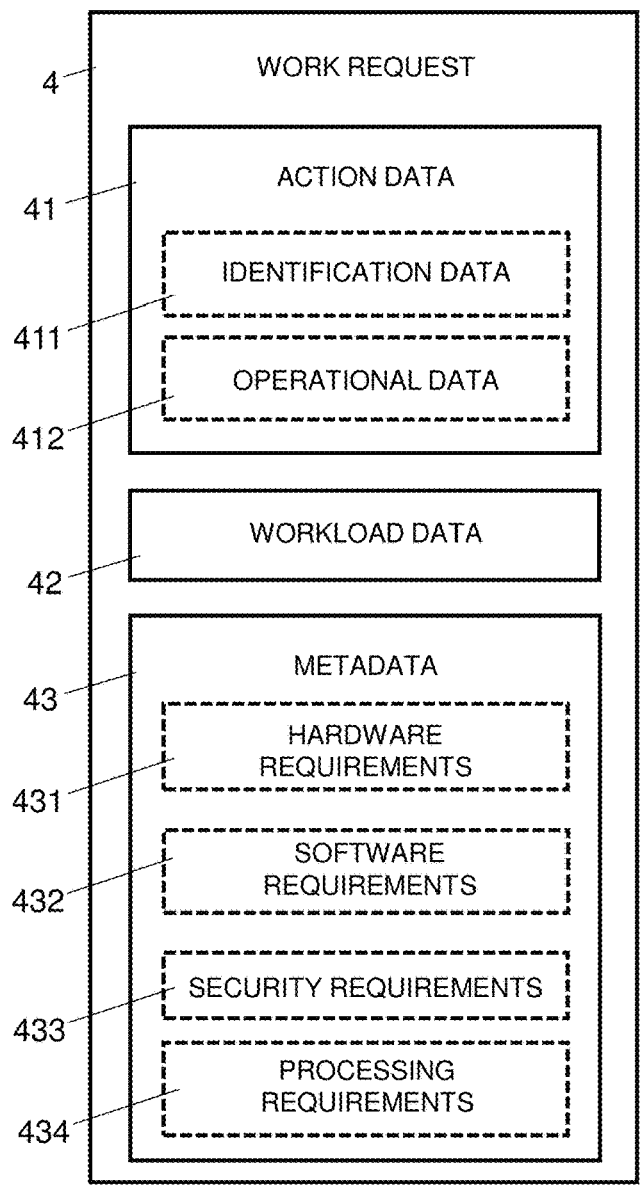
FIG. 3: shows a block diagram illustrating schematically data elements of a work request.

The action data 41, in an embodiment, comprises identification data 411 (shown in FIG. 3). The identification data 411 defines a software application, a software program, a software processing engine, and/or a software formatting engine.

In an embodiment, the action data 41 comprises operational data 412 (shown in FIG. 3) for the computer processing task to be performed. The operational data 412 defines an operational parameter for a software application, a software program, and/or a software processing engine, and/or format specification for a software formatting engine.

The action data 41, in an embodiment, comprises the computer processing task itself, for example as comprised in compiled computer program code, non-compiled computer program code, and/or a computer processing script. This is particularly beneficial when the computer processing task to be performed is not a routine task. For example, the action data 41 comprises formatting data for a document, the formatting data as defined in a mark-up language such as Extensible Mark-up Language (XML). The workload data 42 is input for the computer processing task to be performed. The workload data 42 is the input data which is to be processed, according to the action data 41, to produce a processing result 5. The workload data 42 comprises, for example, a character string which is to be formatted according to the action data 41, in particular according to formatting data as defined in a mark-up language. The metadata 43 indicates processing conditions for the computer processing task to be performed. The processing conditions include hardware requirements 431, software requirements 432, security requirements 433, and/or processing requirements 434. The processing conditions as indicated by the metadata 43 correspond to the processing environment specifications which are stored in the computer system 1 in association with each processing environment 2.

In step S1, the requesting computer 3 transmits the work request 4 to the computer system 1, for example across a communication network such as the Internet or a local area network. The work request 4 is received in the computer system 1 and stored in the memory of the computer system 1.

In step S2, the computer system 1 processes the work request 4. The computer system 1 determines the processing environment 2, selecting the processing environment 2 from the processing environment repository 11. The computer system 1 determines the processing environment 2 using the metadata 43, in particular by identifying one or more processing environments 2 whose processing environment specifications satisfy the processing conditions as defined by the metadata 43. For example, if the workload data 42 is very large and/or the action data 41 defines a complex processing task, the metadata 43 may indicate that the selected processing environment 2 must meet particular hardware requirements 431. For example, if the action data 41 defines a processing task comprising complicated vector operations and the workload data 42 is large, the hardware requirements 431 may stipulate that the processing environment 2 comprises processing units such as graphics processing units (GPUs) which are able to efficiently process vector operations. The metadata 43 may also define particular software requirements 432 which are to be met by the processing environment 2. The metadata 43 may also may also define particular security requirements 433 which are to be met by the processing environment 2. For example, if the workload data 42 comprises highly sensitive data, for example data relating to passwords, cryptographic keys, or proprietary information, the workload data 42 is considered to have high security requirements and the security requirements 433 as included in the metadata 43 shall indicate that the processing task is to be carried out in a processing environment 2 with a high level of security. The metadata may also comprise processing requirements 434 relating to scheduling data, cost data, and/or energy efficiency data.

The computer system 1 is configured to select the processing environment 2 from the processing environment repository 11 by matching the criteria defined by the metadata 43 with the processing environment specification associated with each processing environment 2, 20, which processing environment specification indicates, above other properties of the processing environment 2, 20, the hardware configuration, the software configuration, and/or the security properties, as described in detail with reference to FIG. 1.

In step S3, the computer system 1 selects one or more software container templates from the software container template repository 12. The software container templates are selected depending on the work request 4, in particular such that the software containers associated with the software container templates meet the criteria as defined by the action data 41, the workload data 42, and/or the metadata 43.

In an embodiment, the identification data 411 included in the action data 41 is used by the computer system 1 to select the one or more software container templates from the software container template repository 12.

In an embodiment, the identification data 411 is used to retrieve a computer processing task from a computer processing task repository stored on the computer system 1 or stored remotely from the computer system 1. This is particularly beneficial when the computer processing task to be performed is a task which is routinely performed such that the details of the processing task, for example including computer program code, are stored in the memory of the computer system 1 or retrieved from storage remote to the computer system 1, such that the size of the work request 4 is reduced.

In step S4, the software appliance 22 is generated. The software appliance 22 is generated by the computer system 1 using the software container template. In an embodiment, generating the software appliance 22 comprises generating a software container in step S41.

In an embodiment, the software appliance 22 is generated by the computer system 1 for the selected processing environment 2, in particular taking into consideration one or more characteristics of the selected processing environment 2 and the processing computer system 21. For example, if the selected processing environment 2 comprises a processing computer system 21 with a particular type of processing unit, for example a GPU or TPU, and the processing task involves operations on the workload data 42 suitable for the particular type of processing unit, the software appliance 22 is generated taking to account the particular suitability of the processing computer system 21 for the processing task. In another example, the software appliance 22 is generated by the computer system 1 to comprise operating system components required by the one or more software applications to be contained in the software container, which operating system components are not available in the processing computer system 21 of the selected processing environment 2. Thereby, the computer system 1 flexibly generates the software appliance 22 such that it is compatible with a wide variety of different types of processing environments 2, 20, in particular having a wide variety of hardware configurations and software configurations.

In an embodiment, the software appliance 22 is generated using the identification data 411 and/or the operational data 412 as defined by the action data 41, for example such that the software appliance 22 is generated containing one or more appropriately configured software applications, software programs, software processing engine, and/or software formatting engines.

In step S5, the computer system 1 deploys the software appliance 22. In particular, computer system 1 transmits the software appliance 22 to the processing computer system 21, which receives the software appliance 22. The software appliance 22 is stored in the memory of the processing computer system 21.

In an embodiment, the metadata 43, or a part of the metadata 43, is transmitted from the computer system 1 to the processing computer system 21. For example, if processing requirements specify scheduling data indicating a time period during which the software appliance 22 is to be executed. For a software appliance 22 whose processing result 5 is not required immediately, the scheduling data may indicate that the software appliance 22 is to be executed during off-peak hours, when a cost of electricity and/or a demand on computer resources of the processing computer system 21 is lower than during peak hours. For a software appliance 22 whose processing results 5 is required by a particular end time point, the scheduling data may indicate in the processing deadline data that the software appliance 22 is to be executed at a given starting time point calculated such that the processing results 5 are available by the particular end time point. For a software appliance 22 whose processing results are urgently required, the processing priority data is used to indicate a high priority for execution of the software appliance 22. In an embodiment, the metadata 43, or part of the metadata 43, is incorporated into the software appliance 22.

In step S6, the processing computer system 21 executes the software appliance 22. In particular, the one or more processing units of the processing computer system 21 executes the software appliance 22, in particular executing the one or more software applications contained in the software appliance 22 such that the workload data 42 is executed according to the action data 41 as defined in the work request 4.

In an embodiment, the processing computer system 21 executes the software appliance depending on the metadata 43 transmitted with the software appliance 22 or incorporated into the software appliance. In particular, the processing computer system 21 executes the software appliance according to the scheduling data, the cost data, and/or the energy efficiency data.

In an embodiment, the processing computer system 21 executes the software appliance 22 upon receiving, from the computer system 1, an execution message configured to trigger the execution of the software appliance 22.

The execution of the software appliance 22 produces as an output a processing result 5. The processing result 5 is the workload data 42 as processed according to the action data 41. In an example where the workload data 42 comprises character strings and the action data 41 defines a formatting specification, the processing result 5 includes the character strings formatted according to the formatting specification, which processing result 5 is embodied as a formatted electronic document, for example. In an example where the workload data 42 is an untrained neural network and a set of training data, the processing result 5 being a trained neural network, trained according to hyper parameters as indicated in the action data 41.

In optional step S7, the processing result 5 is transmitted from the processing environment 2 to the requesting computer 3. In particular, the processing result 5 is transmitted from the processing computer system 21 to the requesting computer 3.

In an optional further step, after transmitting the processing result 5, the processing computer system 21 deletes, marks for overwriting, or otherwise disables the software appliance 22.

FIG. 3 shows a block diagram illustrating the work request 4 and the data elements it contains according to various embodiments, each of which is described above in detail with reference to FIGS. 1 and 2.

Figure 4:
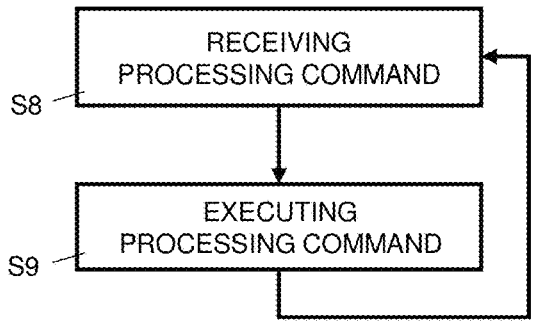
FIG. 4: shows a flow diagram illustrating an exemplary sequence of steps for receiving a processing command and executing the processing command.

FIG. 4 shows a flow diagram illustrating additional steps executed by the processing computer system 21 according to an embodiment of the disclosure. In step S8, the processing computer system 21 receives a processing command directed to the software appliance 22 from the computer system 1 or the requesting computer 3. In step S9, the processing computer system 21 is configured to execute the processing command responsive to the processing command, by performing at least one of: stopping the execution of the software appliance 22, or returning status information related to execution of the software appliance 22.

What is claimed is:

1. A computer-implemented method of generating and executing a software appliance, the method comprising:

receiving in a computer system a work request from a requesting computer, the work request comprising action data, workload data, and metadata, the action data defining a computer processing task to be performed for producing a processing result from the workload data, the workload data being input for the computer processing task to be performed, and the metadata indicating processing conditions for the computer processing task to be performed;

determining, by the computer system, from a processing environment repository a determined processing environment, depending on the metadata included in the work request;

selecting, by the computer system, from a software container template repository one or more selected software container templates, depending on the action data and the metadata included in the work request;

generating, by the computer system, the software appliance for the determined processing environment, using the one or more selected software container templates;

deploying, by the computer system, the software appliance for executing the software appliance on a processing computer system of the determined processing environment, using the workload data included in the work request, whereby executing the software appliance produces the processing result by processing the workload data included in the work request; and receiving, by the computer system, a processing command directed to the software appliance, and responsive to the processing command executing the processing command by performing at least one of: stop execution of the software appliance or return status information related to execution of the software appliance.

2. The method of claim 1, wherein generating the software appliance comprises the computer system generating one or more software containers, using the selected software container templates and the metadata included in the work request, and generating the software appliance using the one or more generated software containers.

3. The method of one of claim 1 or 2, further comprising transmitting the processing result to the requesting computer.

4. The method of one of claims 1 to 3, wherein the metadata includes hardware requirements for the processing computer system of the processing environment, the hardware requirements including at least one of: amount of memory, amount of disk storage space, or processing power; and determining the processing environment comprises the computer system using the hardware requirements.

5. The method of one of claims 1 to 4, wherein the metadata includes software requirements for the processing environment, the software requirements including at least one of: an operating system or a database type; and determining the processing environment comprises the computer system using the software requirements.

6. The method of one of claims 1 to 5, wherein the metadata includes security requirements for the processing environment, the security requirements including at least one of: an on-premise computing center, a cloud computing center, or an authentication level; and determining the processing environment comprises the computer system using the security requirements.

7. The method of one of claims 1 to 6, wherein the metadata includes processing requirements related to execution of the computer processing task to be performed, the processing requirements including at least one of: scheduling data, cost data, or energy efficiency data; and executing the software appliance comprises the computer system using the processing requirements.

8. The method of one of claims 1 to 7, wherein the action data includes identification data for the computer processing task to be performed, the identification data defining at least one of: a software application, a software program, a software processing engine, or a software formatting engine; and selecting the one or more selected software container templates comprises the computer system using the identification data.

9. The method of one of claims 1 to 8, wherein the action data includes operational data for the computer processing task to be performed, the operational data defining at least one of: an operational parameter for a software application, a software program, or a software processing engine, or format specification for a software formatting engine; and selecting the one or more selected software container templates comprises the computer system using the operational data.

10. A computer system for generating and executing a software appliance, the computer system comprising one or more processors configured to perform the steps of:

receiving a work request from a requesting computer, the work request comprising action data, workload data, and metadata, the action data defining a computer processing task to be performed for producing a processing result from the workload data, the workload data being input for the computer processing task to be performed, and the metadata indicating processing conditions for the computer processing task to be performed;

determining from a processing environment repository a determined processing environment, depending on the metadata included in the work request;

selecting from a software container template repository one or more selected software container templates, depending on the action data and the metadata included in the work request;

generating the software appliance for the determined processing environment, using the one or more selected software container templates;

deploying the software appliance for executing the software appliance on a processing computer system of the determined processing environment, using the workload data included in the work request, whereby executing the software appliance produces the processing result by processing the workload data included in the work request; and receiving a processing command directed to the software appliance, and responsive to the processing command executing the processing command by performing at least one of: stop execution of the software appliance or return status information related to execution of the software appliance.

11. The computer system of claim 10, wherein the one or more processors are further configured to perform the method of one of claims 2 to 9.

12. A computer program product comprising a non-transitory computer readable medium having stored thereon program code configured to control one or more processors of a computer system such that the computer system performs the steps of:

receiving a work request from a requesting computer, the work request comprising action data, workload data, and metadata, the action data defining a computer processing task to be performed for producing a processing result from the workload data, the workload data being input for the computer processing task to be performed, and the metadata indicating processing conditions for the computer processing task to be performed;

determining from a processing environment repository a determined processing environment, depending on the metadata included in the work request;

selecting from a software container template repository one or more selected software container templates, depending on the action data and the metadata included in the work request;

generating the software appliance for the determined processing environment, using the one or more selected software container templates;

deploying the software appliance for executing the software appliance on a processing computer system of the determined processing environment, using the workload data included in the work request, whereby executing the software appliance produces the processing result by processing the workload data included in the work request; and receiving a processing command directed to the software appliance, and responsive to the processing command executing the processing command by performing at least one of: stop execution of the software appliance or return status information related to execution of the software appliance.

13. The computer program product of claim 12, wherein the program code is further configured to control the one or more processors of the computer system such that the computer system performs the method of one of claims 2 to 9.

\* \* \* \* \*